United States Patent
Wang et al.

(10) Patent No.: US 6,300,694 B1
(45) Date of Patent: Oct. 9, 2001

(54) COOLING FAN FOR ELECTRIC TREADMILL MOTOR

(76) Inventors: Leao Wang; Peter Wu, both of No 1, Lane 154, Charng Long Rd., Taiping (TW), 411

( * ) Notice: Subject to any disclaimer, the term of this patent is extended or adjusted under 35 U.S.C. 154(b) by 0 days.

(21) Appl. No.: 09/455,356

(22) Filed: Dec. 6, 1999

(51) Int. Cl.$^7$ ...................................... H02K 9/00
(52) U.S. Cl. .............................. 310/62; 310/63; 310/89; 482/54
(58) Field of Search ................. 310/62, 63, 61, 310/89, 91, 53, 59; 482/54, 51

(56) References Cited

U.S. PATENT DOCUMENTS

| | | |
|---|---|---|
| 4,759,540 * | 7/1988 | Yu et al. ................................. 272/69 |
| 4,859,888 * | 8/1989 | Ohbayashi et al. ................. 310/68 R |
| 5,102,380 * | 4/1992 | Jacobson et al. ....................... 482/54 |
| 5,921,893 * | 7/1999 | Hurt ....................................... 482/54 |

* cited by examiner

Primary Examiner—Nestor Ramirez
Assistant Examiner—Thanh Lam
(74) Attorney, Agent, or Firm—Kuo-Hsiung CHIU

(57) ABSTRACT

A cooling fan for an electric treadmill motor comprising an induced-draft fan of an independently running motor disposed at one side of said treadmill motor and covered with a protection hood and a support, wherein said induced-draft fan keeps at a constant air draft power no matter how fast said treadmill motor runs in order to compulsorily perform a strong cooling operation so that the air rapidly passes from a cooling air inlet at the other side of said treadmill motor through an armature inside of said treadmill motor and completely exhausted from an air outlet of said treadmill motor adjacent to said induced-draft fan in order to achieve a cooling effect and to prevent said armature of said treadmill motor from being burnt down due to being overheated.

1 Claim, 1 Drawing Sheet

COOLING FAN FOR ELECTRIC TREADMILL MOTOR

BACKGROUND OF THE INVENTION

1. Field of the Invention

The present invention relates to a cooling fan for electric treadmill motor, and more particularly, to a cooling fan which prevents the armature of the treadmill motor from being burnt down due to being overheated.

2. Description of the Prior Art

First of all, referring to FIG. 2, two induced-draft fans 14, 16 are outwards disposed at two sides of a transmission shaft 12 the treadmill motor 10 respectively. When the treadmill motor 10 runs, the two induced-draft fans 14, 16 simultaneously perform the air draft operation. Moreover, a turning wheel 17 is coupled at the most outward side of the transmission shaft 12 so that a treadmill running belt (not shown) can be driven by a transmission belt 18.

Though this operation model seems reasonable and proper, the turning speed of the treadmill motor 10 is changeable in accordance with the user's operation so that the turning velocity varies tremendously (the adjustment range lies usually between at slowest 280 and at fastest 4800 revolutions) while the loading is kept at the same level (the weight of the user standing on the running belt of the treadmill). The two induced-draft fans 14, 16 are activated by the operation of the treadmill motor 10 so that the air draft efficiency increases when the treadmill motor 10 runs more rapidly; therefore, an optimal cooling effect can be achieved at this case. However, the air draft efficiency decreases when the treadmill motor 10 runs less rapidly and the treadmill motor 10 can be therefore burnt down due to being overheated as the expected cooling effect can't reached.

Briefly, when the revolution velocity of the treadmill motor 10 becomes slow and the loading keeps unchanged (that is, the weight of the user keeps unchanged), the induced-draft fan can't create an expected cooling effect, so that the life of the treadmill motor 10 of the prior art is often shortened.

SUMMARY OF THE INVENTION

It is a main object of the present invention to provide a cooling fan for electric treadmill motor having an induced-draft fan of an independently running motor to perform a cooling operation while the air draft power is kept at a constant level no matter how fast the revolution velocity of the treadmill motor is, so that the life of the treadmill motor can be efficiently extended.

BRIEF DESCRIPTION OF THE DRAWINGS

The drawings disclose illustrative an embodiment of the present invention which serves to exemplify the various advantages and objects hereof, and are as follows.

DETAILED DESCRIPTION OF THE PREFERRED EMBODIMENT

Figure 1:
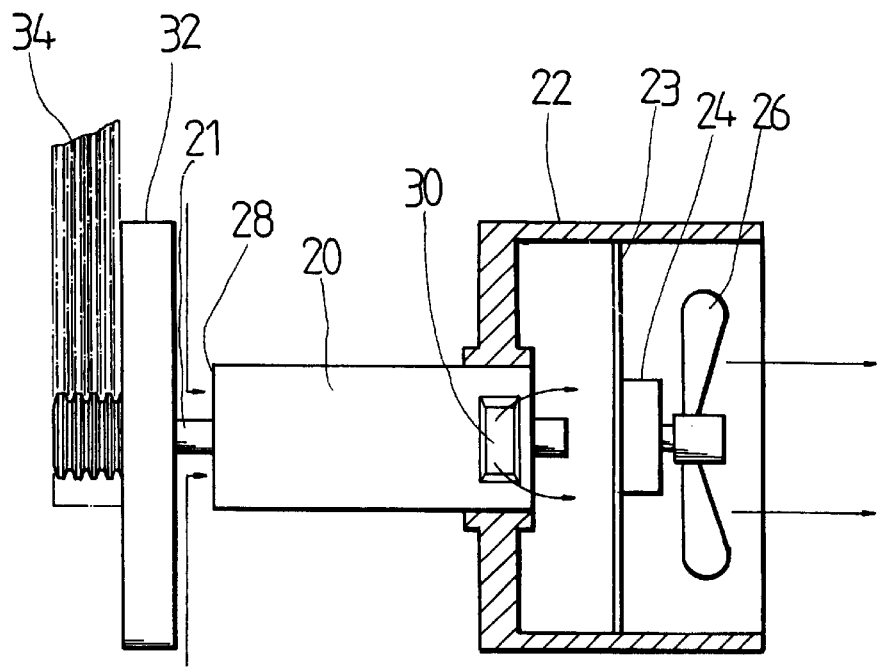
FIG. 1 is a schematic drawing of the arrangement of the motor and the cooling fan for the present invention.
Figure 2:
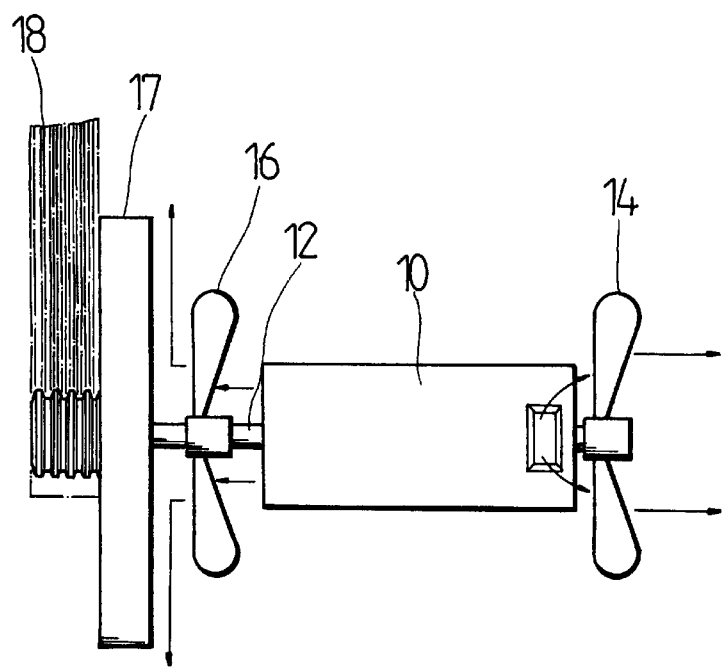
FIG. 2 is a schematic drawing of the arrangement of the motor and the cooling fan for the conventional treadmill.

First of all, referring to FIG. 1, the cooling fan for electric treadmill motor in accordance with the present invention includes an induced-draft fan 26 of an independently running motor 24 disposed at one side of the treadmill motor 20 and covered with a protection hood 22 and a support 23, wherein the induced-draft fan 26 keeps at a constant air draft power no matter how fast the treadmill motor 20 runs in order to compulsorily perform a strong cooling operation so that the air rapidly passes from a cooling air inlet 28 at the other side of the treadmill motor 20 through the armature inside of the treadmill motor 20 (not shown) and completely exhausted from the air outlet 30 of the treadmill motor 20 adjacent to the induced-draft fan 26 in order to achieve a cooling effect and to prevent keep the armature of the treadmill motor 20 from being burnt down due to being overheated.

Of course, a turning wheel 32 is coupled at one side of a transmission shaft 21 of the treadmill motor 20 in order to drive the treadmill running belt (not shown) by means of a belt 34. This belongs to the prior art and won't be therefore described hereafter.

The treadmill motor 20 and the motor 24 are driven by the same main power; accordingly, the both will be simultaneously activated when supplied by the main power.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A motor cooling system for an electric powered treadmill comprising:

a) a first electric motor having a transmission shaft extending from a first end thereof, the first end of the first electric motor having an air inlet;

b) a turning wheel on the transmission shaft configured to engage a driving belt;

c) an air outlet formed adjacent to a second end of the first electric motor;

d) a protection hood on the first electric motor adjacent to the second end, the protection hood extending outwardly from the second end; and, e) a second motor driving a fan located within the protection hood, the second motor being independent of the first electric motor so as to draw a constant air draft through the first electric motor from the air inlet to the air outlet.

* * * * *